United States Patent
Xiong et al.

(10) Patent No.: US 10,942,502 B2
(45) Date of Patent: Mar. 9, 2021

(54) CONTROL METHOD FOR ELECTRONICALLY CONTROLLED SERVO MECHANISM AND ELECTRONICALLY CONTROLLED SERVO MECHANISM AND ROBOT THEREOF

(71) Applicant: UBTECH ROBOTICS CORP LTD, Shenzhen (CN)

(72) Inventors: Youjun Xiong, Shenzhen (CN); Xi Bai, Shenzhen (CN); Wenhua Fan, Shenzhen (CN); Malin Wang, Shenzhen (CN); Jianxin Pang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 0 days.

(21) Appl. No.: 16/581,791

(22) Filed: Sep. 25, 2019

(65) Prior Publication Data

US 2020/0201280 A1 Jun. 25, 2020

(51) Int. Cl.
*G05B 19/23* (2006.01)
*G05B 19/4062* (2006.01)

(52) U.S. Cl.
CPC ....... *G05B 19/231* (2013.01); *G05B 19/4062* (2013.01); *G05B 2219/41119* (2013.01); *G05B 2219/41463* (2013.01)

(58) Field of Classification Search
CPC .................. G05B 19/231; G05B 19/4062
USPC .................. 318/727, 767, 798, 799
See application file for complete search history.

(56) References Cited

U.S. PATENT DOCUMENTS

| 6,472,839 B1 * | 10/2002 | Ishii | B25J 9/1638 |
| | | | 318/568.12 |
| 6,684,128 B1 * | 1/2004 | Tounai | B25J 9/102 |
| | | | 318/568.14 |
| 9,156,166 B2 * | 10/2015 | Oaki | B25J 9/1641 |

* cited by examiner

*Primary Examiner* — David Luo

(57) ABSTRACT

The present disclosure provides a control method for an electronically controlled servo mechanism as well as an apparatus and a robot thereof. The method is for an electronically controlled servo mechanism including a servo having a PI controller, which includes: obtaining related parameter(s) of the PI controller before tuning, where the related parameters includes a proportional coefficient and an integral coefficient; obtaining a current rotational angle of an output shaft of the servo, and calculating an angular deviation between the obtained current rotational angle and an expected rotational angle of an output shaft of the servo; and tuning the related parameter(s) of the PI controller based on the proportional coefficient, the integral coefficient, and the angular deviation. In such a manner, the parameter(s) of the PI controller are tuned to make it equivalent to a P controller, thereby avoiding the large oscillation caused by external interference.

12 Claims, 7 Drawing Sheets

Independent System      Series-wound System

CONTROL METHOD FOR ELECTRONICALLY CONTROLLED SERVO MECHANISM AND ELECTRONICALLY CONTROLLED SERVO MECHANISM AND ROBOT THEREOF

CROSS REFERENCE TO RELATED APPLICATIONS

This application claims priority to Chinese Patent Application No. 201811584697.6, filed Dec. 24, 2018, which is hereby incorporated by reference herein as if set forth in its entirety.

BACKGROUND

1. Technical Field

The present disclosure relates to control technology, and particularly to a control method for an electronically controlled servo mechanism as well as an electronically controlled servo mechanism and a robot thereof.

2. Description of Related Art

In order to achieve the purpose of accurately controlling a servo, most servo mechanisms adopt closed-loop control technologies. However, for different motion control systems, the modes of closed-loop are also different. For example, in the case that the tracking for positions is to be realized, a three-loop control system including a position loop, a speed loop, and a current loop is usually used.

Since the PI (proportional integral) controller of the speed loop has an integral adjustment function, as the calculation continues, if the control amount exceeds the maximum control amount of an actuator, an overshoot will occur and cause the system to oscillate. Especially when multiple servo mechanisms are connected in series, this effect will be further amplified, which results in divergent oscillations. For example, for a service or entertainment robot, when it is subjected to the impact of an external force, multiple electronically controlled servo mechanisms on a limb of a robot which are connected in series will overshoot due to the impact of the external force, which causes the limb to wobble back and forth and difficult to stop.

Therefore, it is necessary to propose a new technical solution to solve the above-mentioned technical problem.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular form "one", "a", and "the" are intended to include the plural forms as well, unless the context clearly indicates otherwise.

It is also to be further understood that the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

It is to be understood that, the sequence of the serial number of the steps in the embodiments does not mean the execution order while the execution order of each process should be determined by its function and internal logic, which should not be taken as any limitation to the implementation process of the embodiments.

It should be noted that, the descriptions of "first", "second", and the like in the embodiments are used to distinguish different areas, modules, and the like, which do not represent the order and not for limit the types.

For the purpose of describing the technical solutions of the present disclosure, the following describes through specific embodiments.

Embodiment One

Figure 1A:
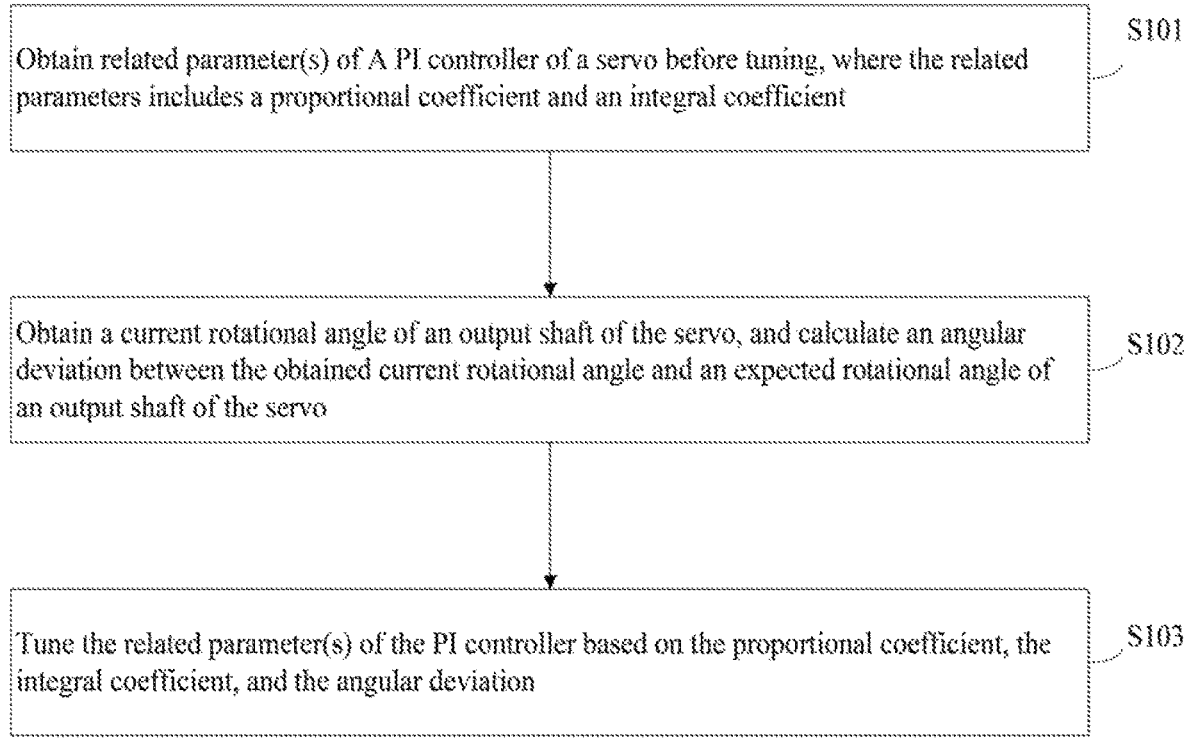
FIG. 1A is a flow chart of a control method for an electronically controlled servo mechanism according to embodiment one of the present disclosure.

FIG. 1A is a flow chart of a control method for an electronically controlled servo mechanism according to embodiment one of the present disclosure. In this embodiment, a control method for an electronically controlled servo mechanism including a servo having a PI controller is provided. The method is a computer-implemented method executable for a processor, which may be implemented through and applied to an electronically controlled servo mechanism shown in FIG. 3 or a robot shown in FIG. 4, or implemented through a computer readable storage medium. In which, for a robot having movable joints (e.g., a humanoid robot), the servos are respectively installed on each of the movable joints. In which, a servo is driven by a motor, which is used as a joint of the robot so as to realize the movement of a limb (e.g., a hand, an arm, a leg, or a head) of the robot which connected to the joint, where the movement of the limb is realized by the motor to rotate an output shaft of the servo which is connected to the limb. In other embodiments, the electronically controlled servo mechanism can include two or more servos. As shown in FIG. 1, the method includes the following steps.

S101: obtaining related parameter(s) of the PI controller before tuning, where the related parameters includes a proportional coefficient and an integral coefficient.

The PI controller, also known as a PI regulator, is a linear controller capable of obtaining a control deviation according to a given value and an actual output value, and then composing a control amount by linearly combining a proportional portion and an integral portion of the deviation, thereby controlling a controlled objective.

In this embodiment, the PI controller is a PI controller of a speed loop in the servo mechanism.

The servo mechanism, also known as a servo system, is a feedback control system used to accurately follow or reproduce a certain process. In most cases, the servo mechanism refers to the feedback control system in which the controlled amount (i.e., the system output) is a mechanical displacement, a velocity or an acceleration, and its function is to make the output mechanical displacement (or rotational angle) to accurately track the input displacement (or rotational angle), thereby driving the controlled objective to perform mechanical motions according to a specified regulation.

It should be noted that, in this embodiment, the servo mechanism is a PID (proportional-integral-derivative) negative feedback adjustment system composed of three closed loops, and the three loops from the interior to the exterior are respectively a position loop, a speed loop, and a current loop, where the position loop is a control loop taking position signals as feedback signals, the speed loop is a control loop taking speed signals as feedback signals, and the current loop is a control loop taking current signals as feedback signals.

Figure 1B:
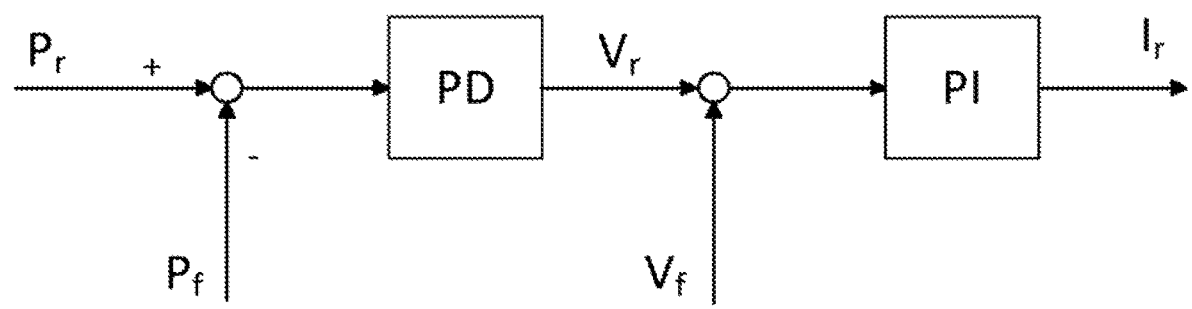
FIG. 1B is a schematic diagram of a three-loop control system for a servo according to embodiment one.

FIG. 1B is a schematic diagram of a three-loop control system for a servo according to embodiment one. For ease of understanding and explanation, FIG. 1B shows a three-loop control system for a servo including a PI (proportional integral) controller of the current loop. As shown in FIG. 1B, Pr refers to a position reference value which is input from exterior to the servo, and Pf refers to a current position value detected by sensor(s) that is actually fed back by the servo. These two values are input into a PD regulator (controller) to perform closed-loop adjustment calculation, so that the PD regulator outputs a reference value Vr of a rotational speed of the output shaft of the servo, then the reference value Vr and a current rotational speed Vf of the output shaft of the servo which is fed back by sensor(s) are input into a PI regulator (controller) to perform closed-loop adjustment calculation again, and eventually a reference value Ir of the current of the servo is output.

In this embodiment, since it mainly tunes the proportional coefficient and the integral coefficient in the PI controller, it can merely obtain the proportional coefficient and the integral coefficient.

In one embodiment, before performing the above-mentioned step S101, the proportional coefficient and the integral coefficient capable of making the above-mentioned servo mechanism to have characteristics of faster response and higher stability are input in advance.

S102: obtaining a current rotational angle of an output shaft of the servo, and calculating an angular deviation between the obtained current rotational angle and an expected rotational angle of an output shaft of the servo.

In one embodiment, the current rotational angle of the servo can be obtained after applying a constant external load to the servo mechanism.

S103: tuning the related parameter(s) of the PI controller based on the proportional coefficient, the integral coefficient, and the angular deviation.

In one embodiment, it can tune the proportional coefficient first, and then tune the integral coefficient.

In one embodiment, it can tune the parameter(s) of the PI controller according to the characteristics of a pure P (proportional) controller.

It can be seen from the above that, in this embodiment, by tuning the parameter(s) of the PI controller, which can be made equivalent to a P controller, thereby preventing the overshoots caused by external interferences when multiple independent servo mechanisms in the robot are connected in series, which is beneficial to improve the stability of the robot and is more ease of use and has better practicability.

Embodiment Two

Figure 2A:
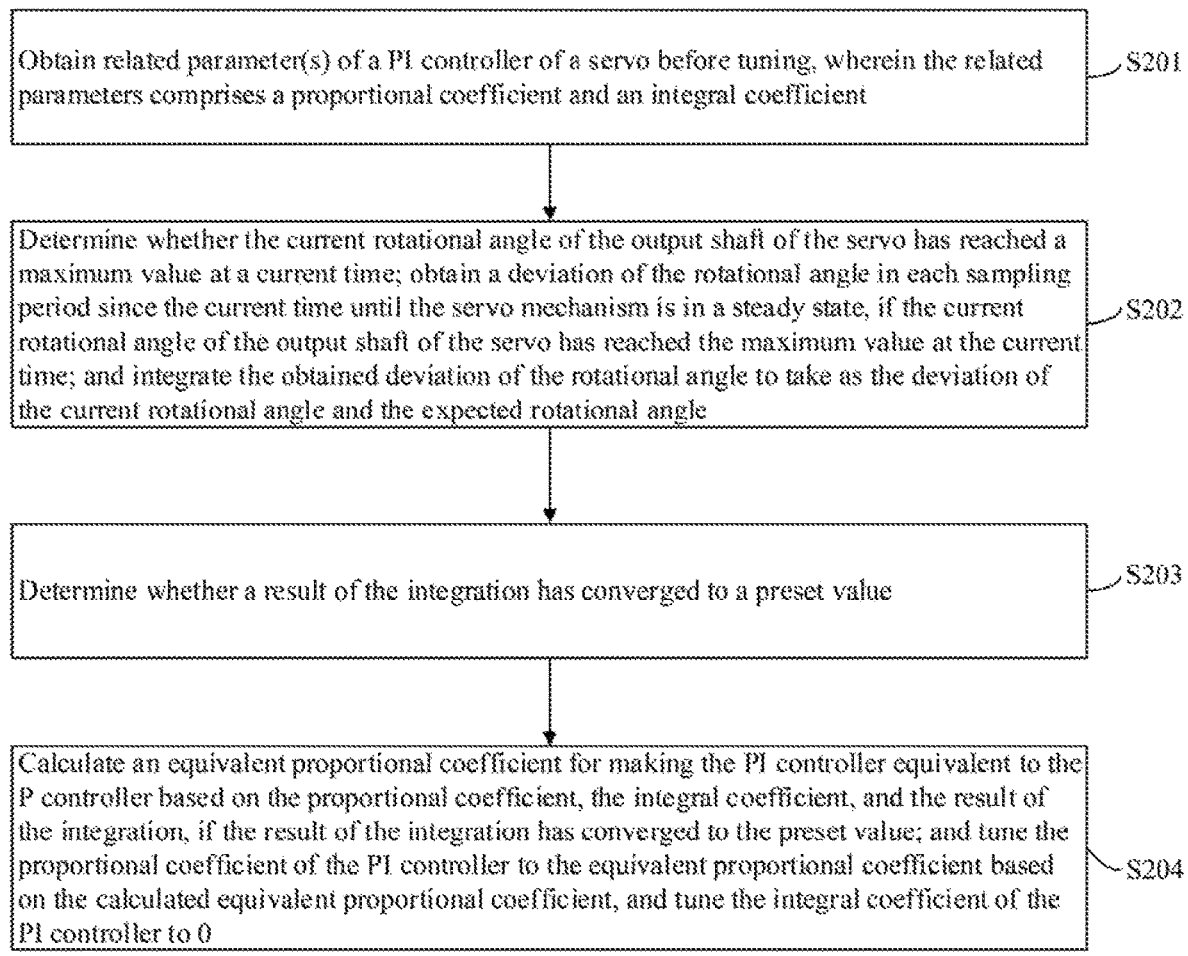
FIG. 2A is a flow chart of a control method for an electronically controlled servo mechanism according to embodiment two of the present disclosure.

FIG. 2A is a flow chart of a control method for an electronically controlled servo mechanism according to embodiment two of the present disclosure. In this embodiment, a control method for an electronically controlled servo mechanism including a servo having a PI controller is provided. As shown in FIG. 2A, the method includes the following steps.

S201: obtaining related parameter(s) of the PI controller before tuning, where the related parameters includes a proportional coefficient and an integral coefficient.

In which, step S201 is the same as step S101 in embodiment one. For the specific implementation, refer to the description of step S101, which is not described herein.

S202: determining whether the current rotational angle of the output shaft of the servo has reached a maximum value at a current time; obtaining a deviation of the rotational angle in each sampling period since the current time until the servo mechanism is in a steady state, if the current rotational angle of the output shaft of the servo has reached the maximum value at the current time; and integrating the obtained deviation of the rotational angle to take as the deviation of the current rotational angle and the expected rotational angle.

In which, the expected rotational angle is a rotational angle of the output shaft of the servo when the servo mechanism is in the steady state.

In one embodiment, it may determine whether the rotational angle of the output shaft of the servo at the current time has reached the maximum value after applying a constant external load to the servo mechanism.

It is to be understood that, if the time at which the rotational angle of the servo reaches the maximum value is indicated as t1, and the time at which the servo mechanism is in the steady state is indicated as t2, t1-t2 can be taken as the total sampling duration t. As such, multiple sets of sampling values can be obtained by sampling with an interval of a fixed sampling period from the time t1.

It is also to be understood that, since the integration is a process of accumulation, after integrating the obtained rotational angle deviation, the rotational angle at the current time and the rotational angle deviation in the steady state can be obtained.

S203: determining whether a result of the integration has converged to a preset value.

S204: calculating an equivalent proportional coefficient for making the PI controller equivalent to the P controller based on the proportional coefficient, the integral coefficient, and the result of the integration, if the result of the integration has converged to the preset value; and tuning the proportional coefficient of the PI controller to the equivalent proportional coefficient based on the calculated equivalent proportional coefficient, and tuning the integral coefficient of the PI controller to 0.

It is to be understood that, after performing the above-mentioned step S204, the PI controller of the speed loop in the servo mechanism will be made equivalent to a P controller, and since the equivalent coefficient is obtained when the servo mechanism is in the steady state, the tuned servo mechanism will still have good steady-state features, which can also achieve the steady-state control effect of the original PD-PI control system. In addition, since to the part of integral adjustment is eliminated, it can effectively avoid the large oscillation caused by external interference when multiple independent systems are connected in series.

Figure 2B:
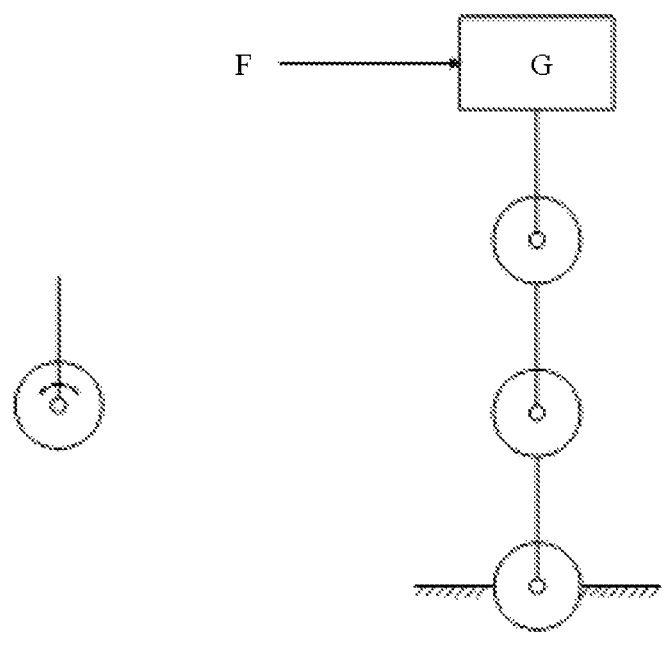
FIG. 2B is a schematic diagram of an inverted pendulum system formed of connecting a plurality of servo mechanisms in series according to embodiment two.

A specific application scenario is taken as an example for explanation and description as follows. FIG. 28 is a schematic diagram of an inverted pendulum system formed of connecting a plurality of servo mechanisms in series according to embodiment two. As shown in FIG. 2B, in the case that several independent servo mechanisms as shown in FIG. 1B on the left side are connected in series to form a cascading system on the right side, they can be applied to the control of the robot. For instance, if the cascaded system on the right side is used to control a leg of a certain robot, the cascaded system can control the ankle, knee and hip joints from bottom to top, respectively. If an external force F is applied to a gravity center side of the cascaded inverted pendulum system, each of the independent systems composing the cascading system will oscillate according to their respective oscillation frequencies. If the respective oscillation frequencies are different, the entire cascading system will continuously oscillate in a divergent manner, and the robot is inclined to be pushed down and then stands unstably. If the PI controller of the speed loop in each independent servo mechanism can be replaced with the P controller, then it can effectively avoid the oscillation of the cascading system which is difficult to converge due to the introduction of the I controller.

In one embodiment, the step of calculating the equivalent proportional coefficient for making the PI controller equivalent to the P controller based on the proportional coefficient, the integral coefficient, and the result of the integration includes calculating the equivalent proportional coefficient for making the PI controller equivalent to the P controller based on the following formula:

$$K'_{p2} = K_{p2} \times \left[1 + \frac{\sum_0^N e_p(k)}{e_p} \times K_{i2}\right];$$

where, $K'_{p2}$ is the tuned proportional coefficient of the PI controller, that is, the equivalent proportional coefficient, $K_{p2}$ is the un-tuned proportional coefficient of the PI controller, $K_{i2}$ is the un-tuned integral coefficient of the P controller, $e_p(k)$ is each calculated position deviation, $e_p$ is the allowed stability deviation, and N is the amount of sampling periods.

For ease of understanding, the PID controller of the speed loop in the servo mechanism can be made equivalent to the P controller according to the above-mentioned formula. The derivation process is as follows.

According to FIG. 1A, the outputs of the PD controller and the PI controller in the servo mechanism before tuning are respectively:

$$V_r = K_{p1} \times [(P_r - P_f) + K_{d1} \times (\dot{P}_r - \dot{P}_f)]; \tag{1}$$

$$I_r = K_{p2} \times \left[(V_r - V_f) + K_{i2} \times \sum_0^N e_v(k)\right]; \tag{2}$$

where, $P_r$ is the input value of the position loop, $P_f$ is the feedback value of the position loop, $V_r$ is the input value of the speed loop, $V_f$ is the feedback value of the speed loop, and $I_r$ is the input value of the current loop, $K_{p1}$ is the proportional coefficient of the PD controller in the servo mechanism before tuning, $K_{d1}$ is the differential coefficient of the PD controller in the servo mechanism before tuning, $K_{p2}$ is the proportional coefficient of the P controller in the servo mechanism before tuning, $K_{i2}$ is the integral coefficient of the PI controller in the servo mechanism before tuning, and $e_v(k)$ is the speed deviation in each sampling period.

It is to be understood that, in the case that the servo mechanism is subjected to a constant external force and in the steady state, the output of the PD controller of the position loop is 0, and the input and feedback of the position loop are both constant values at this time.

At this time, the above-mentioned formula (1) can be simplified to the following formula:

$$V_r = K_{p1} \times (P_r - P_f); \tag{3}$$

according to the above-mentioned formula (3), the above-mentioned formula (2) can be reduced to the following formula:

$$I_r = K_{p1} \times K_{p2} \times (P_r - P_f) + K_{i2} \times K_{p2} \times \sum_0^N e_v(k); \tag{4}$$

if the steady state is considered, the speed deviation is:

$$e_v = V_r - V_f = K_{p1} \times (P_r - P_f); \tag{5}$$

and the positional deviation is:

$$e_p = P_r - P_f; \tag{6}$$

combining the above-mentioned formulas (4), (5), and (6) can obtain:

$$I_r = K_{p1} \times K_{p2} \times e_p + K_{i2} \times K_{p1} \times K_{p2} \times \sum_0^N e_p(k); \quad (7)$$

Figure 2C:
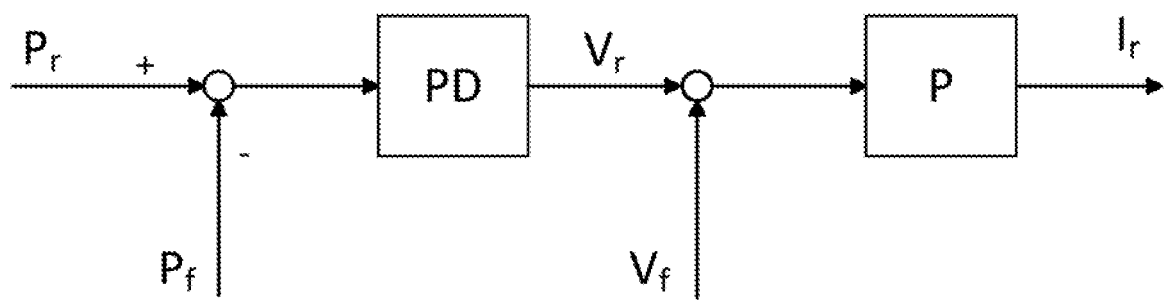
FIG. 2C is a schematic diagram of replacing a PI controller of a speed loop in an original servo mechanism with a P controller according to embodiment two.

FIG. 2C being a schematic diagram of replacing a PI controller of a speed loop in an original servo mechanism with a P controller according to embodiment two. As shown in FIG. 2C, Pr refers to a position reference value which is input from exterior to the servo, and Pf refers to a current position value detected by sensor(s) that is actually fed back by the servo. These two values are input into a PD regulator (controller) to perform closed-loop adjustment calculation, so that the PD regulator outputs a reference value Vr of a rotational speed of the output shaft of the servo, then the reference value Vr and a current rotational speed Vf of the output shaft of the servo which is fed back by sensor(s) are input into a P regulator (controller) to perform closed-loop adjustment calculation again, and eventually a reference value Ir of the current of the servo is output. Assuming that the P controller is now used to replace the PI controller of the speed loop in the original servo mechanism, and the parameter(s) of the P controller are indicated as $K'_{p2}$, at this time, the input reference value of the current loop should meet the following relation:

$$I_r = K'_{p2} \times (V_r - V_f); \quad (8)$$

the above-mentioned formula (8) can be further modified by combining the above-mentioned formulas (5) and (6) to obtain the following formula:

$$I_r = K_{p1} \times K'_{p2} \times e_p; \quad (9)$$

the parameter(s) of the P controller can be obtained by combining the above-mentioned formulas (7) and (9):

$$K'_{p2} = K_{p2} \times \left[ 1 + \frac{\sum_0^N e_p(k)}{e_p} \times K_{i2} \right]. \quad (10)$$

It is to be understood that, after obtaining the above-mentioned formula (10), the equivalent proportional coefficient for making the PI controller of the speed loop in the original servo mechanism equivalent to the P controller can be obtained. Therefore, when tuning the parameter(s) of the PI controller of the speed loop in the servo mechanism according to the above-mentioned formula, it only needs to tune the original proportional coefficient $K_{p2}$ to $K'_{p2}$, and tune the original integral coefficient $K_{i2}$ to 0.

It can be seen from the forgoing that, in comparison with embodiment one, embodiment two provides an implementation method for tuning the parameter(s) of the controller. The parameter(s) of the original PI controller can be tuned based on the parameter(s) of the original PI controller and the result of the integration, which is beneficial to remove the integration part and avoid the problem of divergent oscillation due to external interference when multiple independent systems are connected in series, and has strong ease of use and practicability.

Embodiment Three

Figure 3:
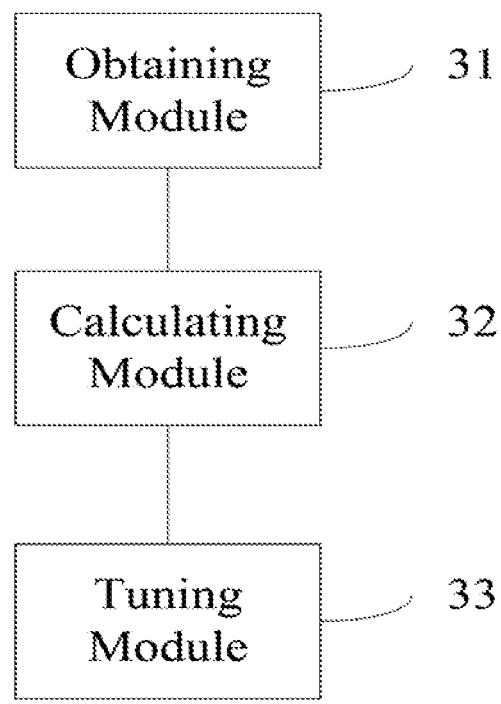
FIG. 3 is a schematic block diagram of an electronically controlled servo mechanism according to embodiment three of the present disclosure.

FIG. 3 is a schematic block diagram of an electronically controlled servo mechanism according to embodiment three of the present disclosure. In this embodiment, an electronically controlled servo mechanism 30 including a servo having a PI controller is provided. The electronically controlled servo mechanism 30 can be applied to a robot shown in FIG. 4. In other embodiments, the electronically controlled servo mechanism 30 can include two or more servos. For convenience of description, only parts related to this embodiment are shown. The electronically controlled servo mechanism can be a software unit, a hardware unit, or a combination of software and hardware units disposed within the robot, or can be integrated into the robot as an independent component. As shown in FIG. 3, the electronically controlled servo mechanism 30 includes:

an obtaining module 31 configured to obtain related parameter(s) of the PI controller before tuning, where the related parameters includes a proportional coefficient and an integral coefficient;

a calculating module 32 configured to obtain a current rotational angle of an output shaft of the servo, and calculating an angular deviation between the obtained current rotational angle and an expected rotational angle of an output shaft of the servo; and a tuning module 33 configured to tune the related parameter(s) of the PI controller based on the proportional coefficient, the integral coefficient, and the angular deviation.

In one embodiment, the calculating module 32 includes:

a determining unit configured to determine whether the current rotational angle of the output shaft of the servo has reached a maximum value at a current time;

an obtaining unit configured to obtain a deviation of the rotational angle in each sampling period since the current time until the electronically controlled servo mechanism is in a steady state, if the current rotational angle of the output shaft of the servo has reached the maximum value at the current time; and an integrating unit configured to integrate the obtained deviation of the rotational angle to take as the deviation of the current rotational angle and the expected rotational angle.

In one embodiment, the apparatus further includes:

a determining module configured to determine whether a result of the integration has converged to a preset value.

In one embodiment, the tuning module 33 includes:

a calculating unit configured to calculate an equivalent proportional coefficient for making the PI controller equivalent to a P controller based on the proportional coefficient, the integral coefficient, and the result of the integration; and a tuning unit configured to tune the proportional coefficient of the PI controller to the equivalent proportional coefficient based on the calculated equivalent proportional coefficient, and tuning the integral coefficient of the PI controller to 0.

In one embodiment, the step of calculating the equivalent proportional coefficient for making the PI controller equivalent to the P controller based on the proportional coefficient, the integral coefficient, and the result of the integration includes calculating the equivalent proportional coefficient for making the PI controller equivalent to the P controller based on the following formula:

$$K'_{p2} = K_{p2} \times \left[ 1 + \frac{\sum_0^N e_p(k)}{e_p} \times K_{i2} \right];$$

where, $K'_{p2}$ is the equivalent proportional coefficient of the PI controller, $K_{p2}$ is the un-tuned proportional coefficient of the PI controller, $K_{i2}$ is the un-tuned integral coefficient of the PI controller, $e_p(k)$ is each calculated position deviation, p is the allowed stability deviation, and N is the amount of sampling periods.

In this embodiment, each of the above-mentioned modules/units is implemented in the form of software, which can be computer program(s) stored in a memory of the electronically controlled servo mechanism 30 and executable on a processor of the electronically controlled servo mechanism 30. In other embodiments, each of the above-mentioned modules/units may be implemented in the form of hardware (e.g., a circuit of the electronically controlled servo mechanism 30 which is coupled to the processor of the electronically controlled servo mechanism 30) or a combination of hardware and software (e.g., a circuit with a single chip microcomputer).

Embodiment Four

Figure 4:
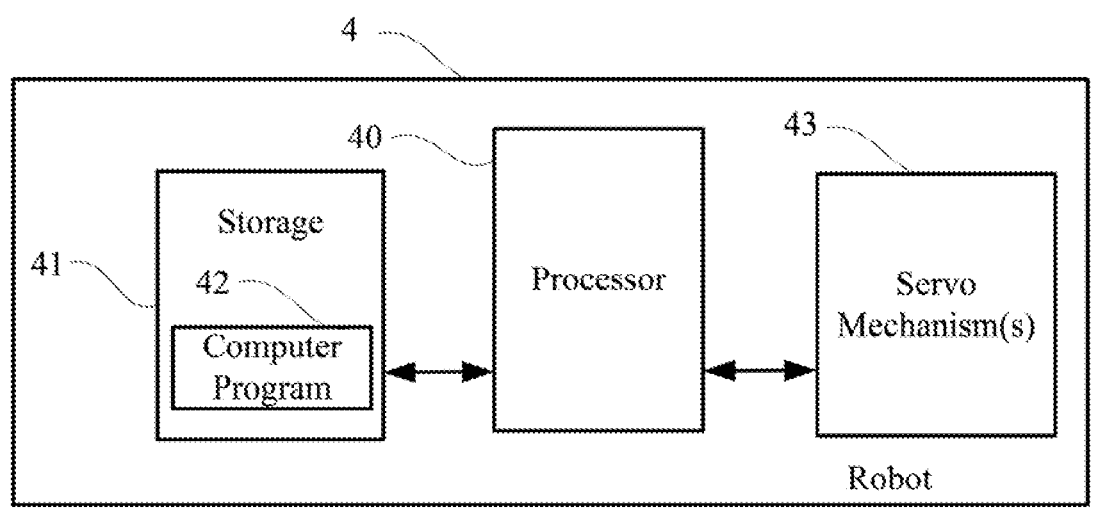
FIG. 4 is a schematic block diagram of a robot according to embodiment four of the present disclosure.

FIG. 4 is a schematic block diagram of a robot according to embodiment four of the present disclosure. As shown in FIG. 4, in this embodiment, a robot 4 includes a processor 40, a storage 41, a computer program 42 stored in the storage 41 and executable on the processor 40, and servo mechanism(s) 43 including, for example, a servo having a PI controller. When executing (instructions in) the computer program 42, the processor 40 implements the steps in the above-mentioned method embodiment one, for example, steps S101-S103 shown in FIG. 1, or implements the steps in the above-mentioned method embodiment two, for example, steps S201-S204 shown in FIG. 2. Alternatively, when the processor 40 executes the (instructions in) computer program 42, the functions of each module/unit in the above-mentioned device embodiments, for example, the functions of the modules 31-33 shown in FIG. 3 are implemented. In other embodiments, each of the electronically controlled servo mechanism(s) can include two or more servos.

Exemplarily, the computer program 42 may be divided into one or more modules/units, and the one or more modules/units are stored in the storage 41 and executed by the processor 40 to realize the present disclosure. The one or more modules/units may be a series of computer program instruction sections capable of performing a specific function, and the instruction sections are for describing the execution process of the computer program 42 in the robot 4. For example, the computer program 42 can be divided into an obtaining module, a calculating module, and a tuning module. The function of each module is as follows:

the obtaining module is configured to obtain related parameter(s) of the PI controller before tuning, where the related parameters includes a proportional coefficient and an integral coefficient;

the calculating module is configured to obtain a current rotational angle of an output shaft of the servo, and calculating an angular deviation between the obtained current rotational angle and an expected rotational angle of an output shaft of the servo; and the tuning module is configured to tune the related parameter(s) of the PI controller based on the proportional coefficient, the integral coefficient, and the angular deviation.

The robot 4 may include, but is not limited to, the processor 40 and the storage 41. It can be understood by those skilled in the art that FIG. 4 is merely an example of the robot 4 and does not constitute a limitation on the robot 4, and may include more or fewer components than those shown in the FIG., or a combination of some components or different components. For example, the robot 4 may further include an input/output device, a network access device, a bus, and the like.

The processor 40 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 41 may be an internal storage unit of the robot 4, for example, a hard disk or a memory of the robot 4. The storage 41 may also be an external storage device of the robot 4, for example, a plug-in hard disk, a smart media card (SMC), a secure digital (SD) card, flash card, and the like, which is equipped on the robot 4. Furthermore, the storage 41 may further include both an internal storage unit and an external storage device, of the robot 4. The storage 41 is configured to store the computer program 42 and other programs and data required by the robot 4. The storage 41 may also be used to temporarily store data that has been or will be output.

Those skilled in the art may clearly understand that, for the convenience and simplicity of description, as to the specific operation process of the above-mentioned system, apparatus, and units, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the module, units and/or steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it is to be understood that the disclosed system, apparatus, and method may be implemented in other manners. For example, the above-mentioned apparatus embodiment is merely exemplary. For example, the division of units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated unit is implemented in the form of a software functional unit and is sold or used as an independent product, the integrated unit may be stored in a non-transitory computer-readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer-readable storage medium, which may implement the steps of each of the above-mentioned method embodiments when executed by a processor. In which, the computer program includes computer program codes which may be the form of source codes, object codes, executable files, certain intermediate, and the like. The computer-readable medium may include any primitive or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it is to be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented control method for an electronically controlled servo mechanism comprising a servo having a PI controller, comprising executing on a processor steps of:
    obtaining one or more related parameters of the PI controller before tuning, wherein the related parameters comprises a proportional coefficient and an integral coefficient;
    obtaining a current rotational angle of an output shaft of the servo, and calculating an angular deviation between the obtained current rotational angle and an expected rotational angle of an output shaft of the servo; and
    tuning the one or more related parameters of the PI controller based on the proportional coefficient, the integral coefficient, and the angular deviation;
    wherein the step of obtaining the current rotational angle of the output shaft of the servo, and calculating the angular deviation between the obtained current rotational angle and the expected rotational angle of the output shaft of the servo comprises:
    determining whether the current rotational angle of the output shaft of the servo has reached a maximum value at a current time;
    obtaining a deviation of the rotational angle in each sampling period since the current time until the electronically controlled servo mechanism is in a steady state, in response to the current rotational angle of the output shaft of the servo having reached the maximum value at the current time; and
    integrating the obtained deviation of the rotational angle to take as the deviation of the current rotational angle and the expected rotational angle.

2. The method of claim 1, wherein after the step of integrating the obtained deviation of the rotational angle further comprises:
    determining whether a result of the integration has converged to a preset value.

3. The method of claim 2, wherein the step of tuning the one or more related parameters of the PI controller based on the proportional coefficient, the integral coefficient, and the angular deviation comprises:
    calculating an equivalent proportional coefficient for making the PI controller equivalent to a P controller based on the proportional coefficient, the integral coefficient, and the result of the integration; and
    tuning the proportional coefficient of the PI controller to the equivalent proportional coefficient based on the calculated equivalent proportional coefficient, and tuning the integral coefficient of the PI controller to 0.

4. The method of claim 3, wherein the step of calculating the equivalent proportional coefficient for making the PI controller equivalent to the P controller based on the proportional coefficient, the integral coefficient, and the result of the integration comprises calculating the equivalent proportional coefficient for making the PI controller equivalent to the P controller based on the following formula:

$$K'_{p2} = K_{p2} \times \left[1 + \frac{\sum_0^N e_p(k)}{e_p} \times K_{i2}\right];$$

where, $K'_{p2}$ is the equivalent proportional coefficient, $K_{p2}$ is the un-tuned proportional coefficient of the PI controller, $K_{i2}$ is the un-tuned integral coefficient of the PI controller, $e_p(k)$ is each calculated position deviation, $e_p$ is the allowed stability deviation, and N is the amount of sampling periods.

5. An electronically controlled servo mechanism comprising a servo having a PI controller, comprising:
    an obtaining module configured to obtain one or more related parameters of the PI controller before tuning, wherein the related parameters comprises a proportional coefficient and an integral coefficient;
    a calculating module configured to obtain a current rotational angle of an output shaft of the servo, and calculating an angular deviation between the obtained current rotational angle and an expected rotational angle of an output shaft of the servo;
    a tuning module configured to tune the one or more related parameters of the PI controller based on the proportional coefficient, the integral coefficient, and the angular deviation;
    a determining unit configured to determine whether the current rotational angle of the output shaft of the servo has reached a maximum value at a current time;

an obtaining unit configured to obtain a deviation of the rotational angle in each sampling period since the current time until the electronically controlled servo mechanism is in a steady state, in response to the current rotational angle of the output shaft of the servo having reached the maximum value at the current time; and an integrating unit configured to integrate the obtained deviation of the rotational angle to take as the deviation of the current rotational angle and the expected rotational angle.

6. The mechanism of claim 5, comprising:
a determining module configured to determine whether a result of the integration has converged to a preset value.

7. The mechanism of claim 6, wherein the tuning module comprises:
a calculating unit configured to calculate an equivalent proportional coefficient for making the PI controller equivalent to a P controller based on the proportional coefficient, the integral coefficient, and the result of the integration; and
a tuning unit configured to tune the proportional coefficient of the PI controller to the equivalent proportional coefficient based on the calculated equivalent proportional coefficient, and tuning the integral coefficient of the PI controller to 0.

8. The mechanism of claim 7, wherein the calculating unit is configured to:
the calculating unit is configured to calculate the equivalent proportional coefficient for making the PI controller equivalent to the P controller based on the following formula:

$$K'_{p2} = K_{p2} \times \left[1 + \frac{\sum_{0}^{N} e_p(k)}{e_p} \times K_{i2}\right];$$

where, $K'_{p2}$ is the equivalent proportional coefficient, $K_{p2}$ is the un-tuned proportional coefficient of the PI controller, $K_{i2}$ is the un-tuned integral coefficient of the PI controller, $e_p(k)$ is each calculated position deviation, $e_p$ is the allowed stability deviation, and N is the amount of sampling periods.

9. A robot, comprising:
an electronically controlled servo mechanism comprising a servo having a PI controller;
a memory;
a processor; and
one or more computer programs stored in the memory and executable on the processor, wherein the one or more computer programs comprise:
instructions for obtaining one or more related parameters of the PI controller before tuning, wherein the related parameters comprises a proportional coefficient and an integral coefficient;
instructions for obtaining a current rotational angle of an output shaft of the servo, and calculating an angular deviation between the obtained current rotational angle and an expected rotational angle of an output shaft of the servo;

instructions for tuning the one or more related parameters of the PI controller based on the proportional coefficient, the integral coefficient, and the angular deviation;
wherein the instructions for obtaining the current rotational angle of the output shaft of the servo, and calculating the angular deviation between the obtained current rotational angle and the expected rotational angle of the output shaft of the servo comprise:
instructions for determining whether the current rotational angle of the output shaft of the servo has reached a maximum value at a current time;
instructions for obtaining a deviation of the rotational angle in each sampling period since the current time until the electronically controlled servo mechanism is in a steady state, in response to the current rotational angle of the output shaft of the servo having reached the maximum value at the current time; and
instructions for integrating the obtained deviation of the rotational angle to take as the deviation of the current rotational angle and the expected rotational angle.

10. The robot of claim 9, wherein after the instructions for integrating the obtained deviation of the rotational angle further comprise:
instructions for determining whether a result of the integration has converged to a preset value.

11. The robot of claim 10, wherein the instructions for tuning the one or more related parameters of the PI controller based on the proportional coefficient, the integral coefficient, and the angular deviation comprise:
instructions for calculating an equivalent proportional coefficient for making the PI controller equivalent to a P controller based on the proportional coefficient, the integral coefficient, and the result of the integration; and
instructions for tuning the proportional coefficient of the PI controller to the equivalent proportional coefficient based on the calculated equivalent proportional coefficient, and tuning the integral coefficient of the PI controller to 0.

12. The robot of claim 11, wherein the instructions for calculating the equivalent proportional coefficient for making the PI controller equivalent to the P controller based on the proportional coefficient, the integral coefficient, and the result of the integration comprises instructions for calculating the equivalent proportional coefficient for making the P1 controller equivalent to the P controller based on the following formula:

$$K'_{p2} = K_{p2} \times \left[1 + \frac{\sum_{0}^{N} e_p(k)}{e_p} \times K_{i2}\right];$$

where, $K'_{p2}$ is the equivalent proportional coefficient, $K_{p2}$ is the un-tuned proportional coefficient of the PI controller, $K_{i2}$ is the un-tuned integral coefficient of the PI controller, $e_p(k)$ is each calculated position deviation, $e_p$ is the allowed stability deviation, and N is the amount of sampling periods.

* * * * *